US012407084B2

(12) United States Patent
Amjadi et al.

(10) Patent No.: US 12,407,084 B2
(45) Date of Patent: Sep. 2, 2025

(54) WIDEBAND ANTENNA STRUCTURES IN CORNER OF ELECTRONIC DEVICE

(71) Applicant: Apple Inc., Cupertino, CA (US)

(72) Inventors: Seyed Mohammad Amjadi, Santa Clara, CA (US); Yuan Tao, Santa Clara, CA (US); Hao Xu, Cupertino, CA (US); Yiren Wang, Cupertino, CA (US); Xue Yang, Shenzhen (CN); Mattia Pascolini, San Francisco, CA (US); Hongfei Hu, Cupertino, CA (US); Enrique Ayala Vazquez, Watsonville, CA (US); Ming-Ju Tsai, Sunnyvale, CA (US); Ana Papio Toda, San Jose, CA (US); Yuancheng Xu, San Jose, CA (US); Jingni Zhong, Santa Clara, CA (US); Nikolaj P Kammersgaard, Copenhagen (DK); Sidharath Jain, Redwood City, CA (US); Haozhan Tian, San Jose, CA (US); Ming Chen, Cupertino, CA (US); Linqiang Zou, Shanghai (CN)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 18/458,689

(22) Filed: Aug. 30, 2023

(65) Prior Publication Data

US 2024/0079757 A1 Mar. 7, 2024

Related U.S. Application Data

(60) Provisional application No. 63/404,111, filed on Sep. 6, 2022.

(51) Int. Cl.

| | |
|---|---|
| ***H01Q 1/22*** | (2006.01) |
| ***H01Q 1/48*** | (2006.01) |
| ***H01Q 9/04*** | (2006.01) |

(52) U.S. Cl.

CPC ................ *H01Q 1/22* (2013.01); *H01Q 1/48* (2013.01); *H01Q 9/0421* (2013.01); *H01Q 9/0442* (2013.01); *H01Q 9/045* (2013.01)

(58) Field of Classification Search

CPC .......... H01Q 1/22; H01Q 1/48; H01Q 9/0421; H01Q 9/0442; H01Q 9/045; H01Q 9/42; H01Q 13/10; H01Q 1/243

See application file for complete search history.

(56) References Cited

U.S. PATENT DOCUMENTS 9,178,278 B2 11/2015 Zhu et al.
10,014,568 B2 7/2018 Yoshida et al.
(Continued)

FOREIGN PATENT DOCUMENTS

EP 4057445 A1 9/2022

*Primary Examiner* — Seung H Lee

(74) *Attorney, Agent, or Firm* — Treyz Law Group, P.C.; Michael H. Lyons

(57) ABSTRACT

An electronic device may be provided with peripheral conductive housing structures having first and second segments. A flexible printed circuit may have a first tail that extends along the first and second segments and a second tail that extends along the first segment. A conductive trace on the first tail may be coupled to an antenna feed terminal on the second segment. A conductive trace on the second tail may couple the conductive trace on the first tail to the first segment. A tuner and filters may be disposed on the flexible printed circuit and may be coupled to the conductive traces. The conductive trace on the second tail may have a tapered width. An antenna in the device may have a resonating element that includes both the first and second segments, thereby allowing the antenna to exhibit a wide bandwidth from 1.1-5 GHz.

20 Claims, 8 Drawing Sheets

(56) References Cited

U.S. PATENT DOCUMENTS

| | | | | |
|---|---|---|---|---|
| 10,256,527 | B2 * | 4/2019 | Kim | H01Q 7/00 |
| 10,705,570 | B2 * | 7/2020 | Kuna | H01Q 21/28 |
| 10,886,607 | B2 | 1/2021 | Ayala Vazquez et al. | |
| 10,916,832 | B2 | 2/2021 | Azad et al. | |
| 10,957,978 | B2 | 3/2021 | Cooper et al. | |
| 10,998,622 | B2 * | 5/2021 | Sakong | H01Q 5/378 |
| 11,114,748 | B2 | 9/2021 | Yarga et al. | |
| 12,062,835 | B2 * | 8/2024 | Irci | H01Q 1/44 |

* cited by examiner

WIDEBAND ANTENNA STRUCTURES IN CORNER OF ELECTRONIC DEVICE

This application claims the benefit of U.S. Provisional Patent Application No. 63/404,111, filed Sep. 6, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for electronic devices to cover a growing number of communications bands and to also include other components such as cameras.

Because antennas have the potential to interfere with each other and with components in an electronic device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth, even in the presence of other components such as cameras.

SUMMARY

An electronic device may be provided with wireless circuitry and a housing having peripheral conductive housing structures. Dielectric-filled gaps may divide the peripheral conductive housing structures into at least first, second, and third segments. A slot may separate the first, second, and third segments from ground structures. The ground structures may include a mid-chassis, a conductive support plate in a rear housing wall, and/or conductive portions of a display.

The mid-chassis may be coupled to a first location on the first segment. The mid-chassis may also be coupled to a second location on the second segment. A flexible printed circuit may be mounted in the device and may extend along the first and second segments. The flexible printed circuit may have a main body portion and first and second tails extending in parallel from the main body portion. The second tail may extend along the first segment, across one of the dielectric-filled gaps, and may be coupled to a third location on the second segment. The first tail may extend along the first segment and may be coupled to a fourth location on the first segment. The third and fourth locations may be adjacent to the dielectric-filled gap.

The flexible printed circuit may include a transmission line path for an antenna. The transmission line path may include a signal conductor that extends through the main body portion and the second tail. The signal conductor may be coupled to the third location on the second segment to form a positive antenna feed terminal for an antenna. The flexible printed circuit may include a conductive trace that couples the signal conductor to the fourth location on the first segment. A tuner may be disposed on the flexible printed circuit and may be coupled to the conductive trace and the signal conductor. The conductive trace may have a tapered width that decreases from the tuner to the fourth location on the first segment. A conductive spring on the flexible printed circuit may couple ground traces on the flexible printed circuit to a camera module.

Radio-frequency antenna currents may be conveyed over the positive antenna feed terminal, the second segment, the conductive trace, the signal conductor, and a portion of the first segment extending between the first and fourth locations. In this way, the antenna may include an antenna resonating element that includes both the second segment and the portion of the first segment. This may effectively increase the radiating length of the antenna, allowing the antenna to radiate over a wide bandwidth from 1.1-5 GHz. Filters may be disposed on the flexible printed circuit to separate the radio-frequency antenna current by frequency band.

DETAILED DESCRIPTION

Figure 1:
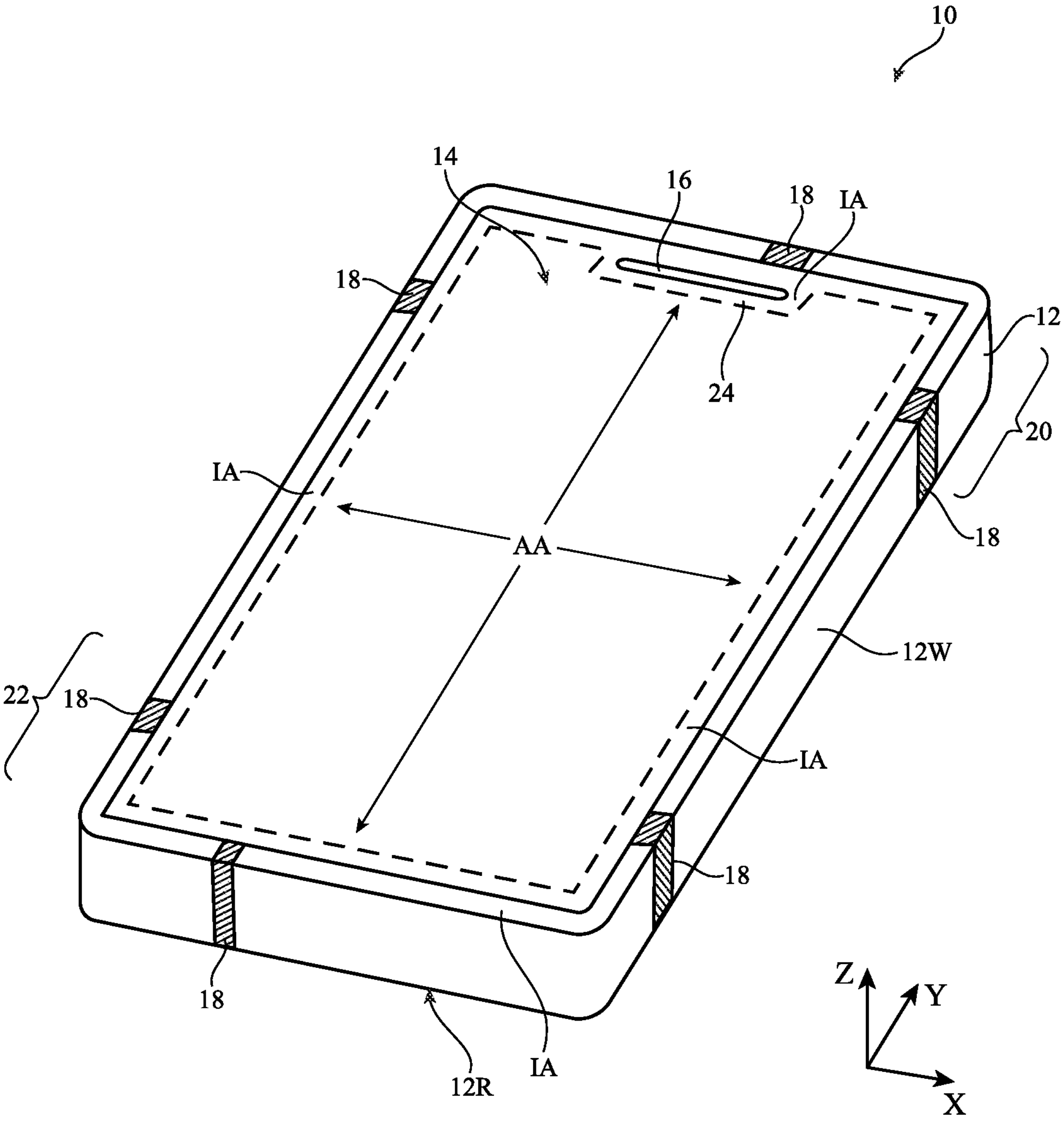
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Gaps 18 may sometimes also be referred to herein as splits 18 in peripheral conductive housing structures 12W. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
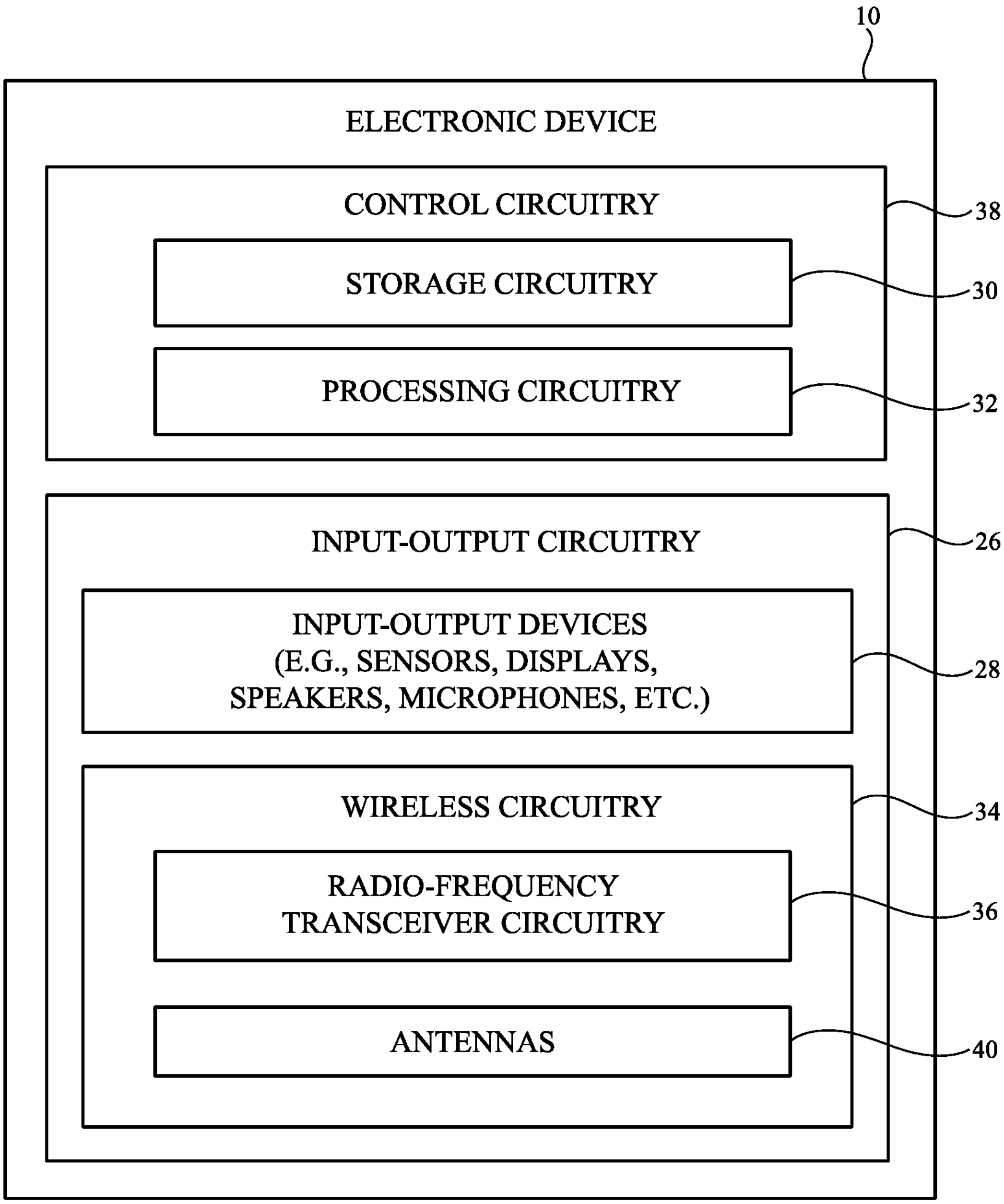
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
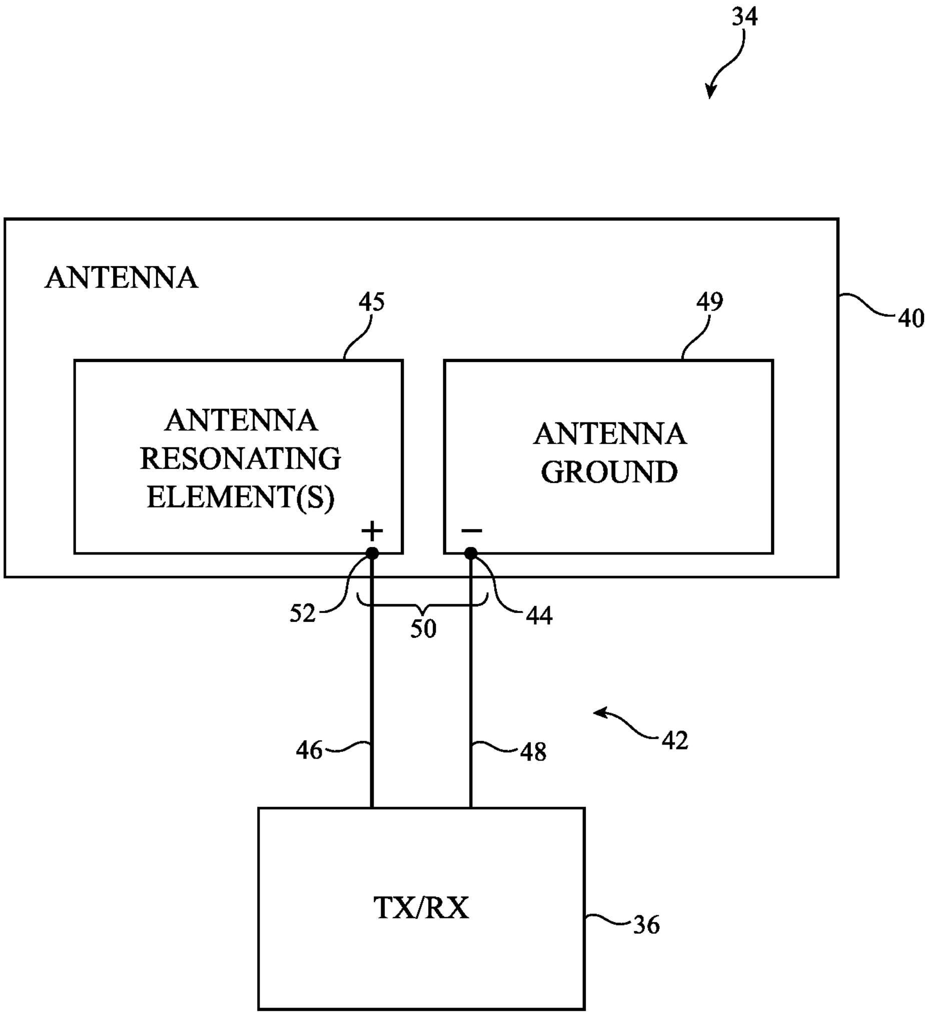
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
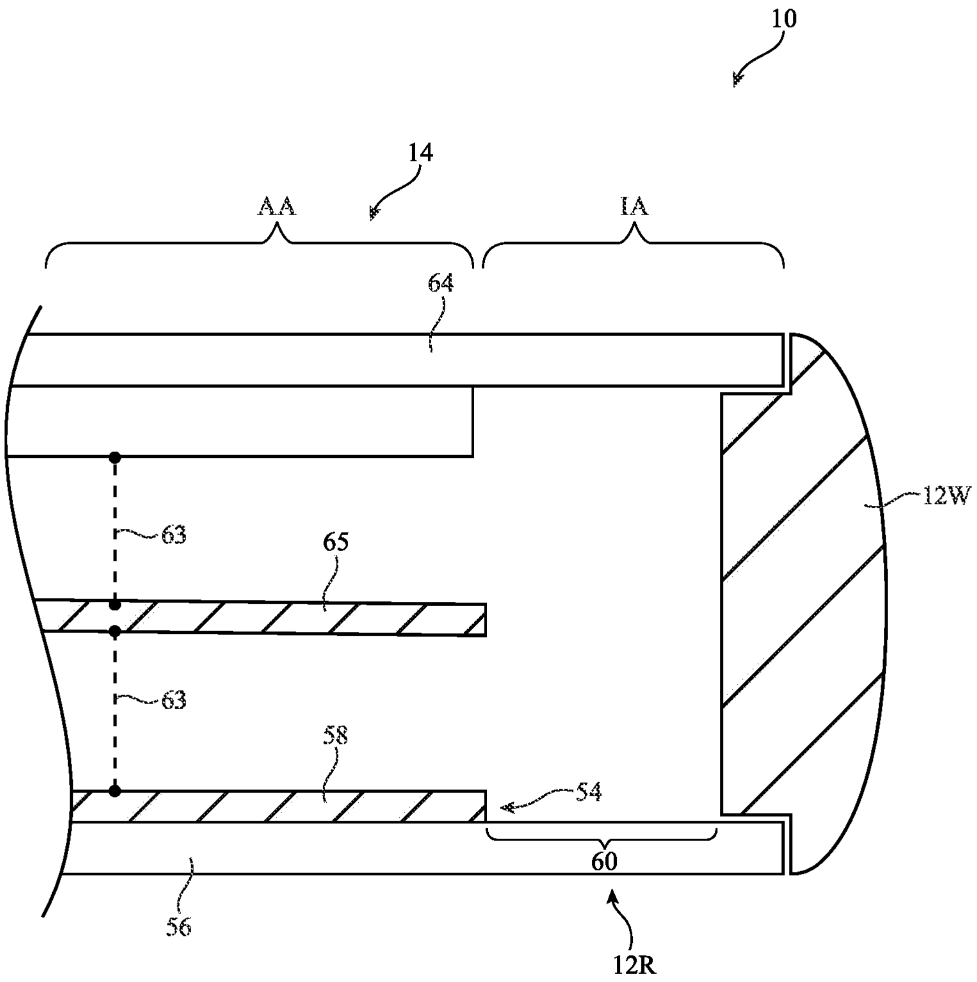
FIG. 4 is a cross-sectional side view of an illustrative electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65 or ground layer 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10 (e.g., ground layers for the antennas).

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
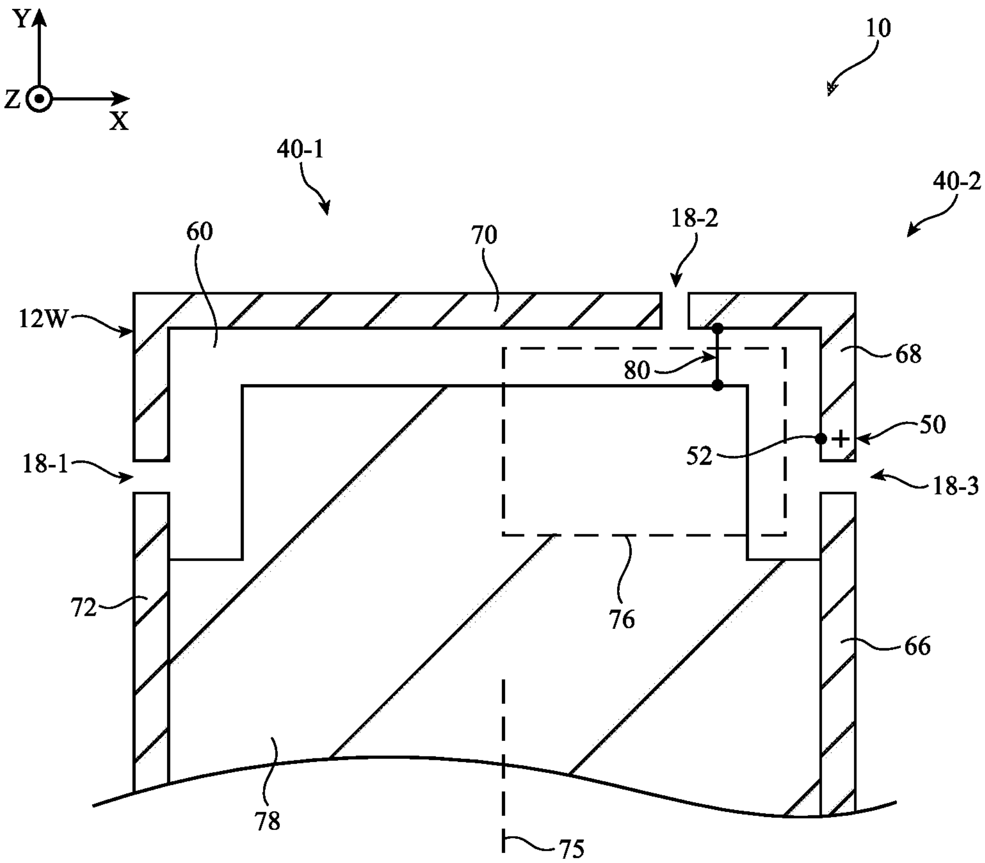
FIG. 5 is an interior top view of the upper end of an illustrative electronic device having antennas and a camera overlapping one of the antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top (front) interior view showing how the upper end of device 10 (e.g., within region 20 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10, a third conductive sidewall at the right edge of device 10, and a fourth conductive sidewall at the bottom edge of device 10 (not shown in FIG. 5). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 72 of peripheral conductive housing structures 12W from segment 70 of peripheral conductive housing structures 12W. Gap 18-2 may divide the second conductive sidewall to separate segment 70 from segment 68 of peripheral conductive housing structures 12W. Gap 18-3 may divide the third conductive sidewall to separate segment 68 from segment 66 of peripheral conductive housing structures 12W. In this example, segment 70 forms the upper-left corner of device 10 (e.g., segment 68 may have a bend at the corner) and is formed from the first and second conductive sidewalls of peripheral conductive housing structures 12W (e.g., in upper region 20 of FIG. 1).

Device 10 may include ground structures 78 (e.g., structures that form part of antenna ground 49 of FIG. 3 for one or more of the antennas in device 10). Ground structures 78 may include one or more metal layers such conductive support plate 58 (FIG. 4), mid-chassis 65 (FIG. 4), conductive display structures in display module 62 (FIG. 4), conductive interconnect structures 63 (FIG. 4), conductive traces on a printed circuit board, conductive portions of one or more components in device 10, etc. Ground structures 78 may extend between opposing sidewalls of peripheral conductive housing structures 12W. For example, ground structures 78 may extend from segment 72 to segment 66 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration).

Ground structures 78 may define an edge of slot 60 and may be separated from peripheral conductive housing structures 12W by slot 60. Device 10 may have a longitudinal axis 75 that bisects the width of device 10 and that runs parallel to the length of device 10 (e.g., parallel to the Y-axis). As shown in FIG. 5, slot 60 may separate ground structures 78 from segments 68 and 70 of peripheral conductive housing structures 12W (e.g., the upper edge of slot 60 may be defined by segments 68 and 70 whereas the lower edge of slot 60 is defined by ground structures 78). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the upper region of device 10 (sometimes referred to herein as lower antennas). For example, device 10 may include a first antenna 40-1 having an antenna resonating (radiating) element 45 (FIG. 3) that includes an antenna arm formed from segment 70, a positive antenna feed terminal 52 coupled to segment 70, and an antenna ground 49 (FIG. 3) formed from ground structures 78. Device 10 may also include a second antenna 40-2 having an antenna resonating element (e.g., resonating element arms) formed from segment 68 and optionally segment 66, a positive antenna feed terminal 52 coupled to segment 68 (e.g., at or adjacent to gap 18-3), and an antenna ground formed from ground structures 78. Antenna 40-2 may, if desired, have one or more return paths 80 that couple segment 68 to ground structures 78 across slot 60 (e.g., at or adjacent gap 18-2 in an inverted-F antenna configuration).

Device 10 may include optical components that overlap the area/volume of antenna 40-2 (e.g., that at least partially overlap slot 60). The optical components may include one or more cameras (e.g., image sensors). The cameras may be rear-facing cameras that receive light through rear housing wall 12R of device 10 (FIGS. 1 and 4). The cameras may be integrated into a single camera module 76. Camera module 76 may include one or more printed circuits mounted to the camera(s) in the camera module. The printed circuit(s) may convey control signals to the camera(s) and/or may convey image data gathered/captured by the camera(s). The camera module may include a conductive housing, cowling, or frame over the camera(s) that may help to attach the camera module to ground structures 78. The conductive housing, cowling, or frame may be held at a ground potential and may form part of the antenna ground for antenna 40-2.

If care is not taken, the presence of conductive structures in camera module 76 overlapping the radiating volume of antenna 40-2 can undesirably deteriorate the wireless performance of antenna 40-2. At the same time, because antenna 40-2 is relatively small, it can be difficult to configure antenna 40-2 to cover a sufficiently wide range of frequencies. It may, for example, be desirable for antenna 40-2 to be able to cover frequencies from around 1.1 GHz to around 5 GHz (e.g., for covering the L5 GPS band, the cellular LMB, MB, HB, and UHB, the 2.4 GHz WLAN/WPAN bands, the S-band, and the L-band).

Figure 6:
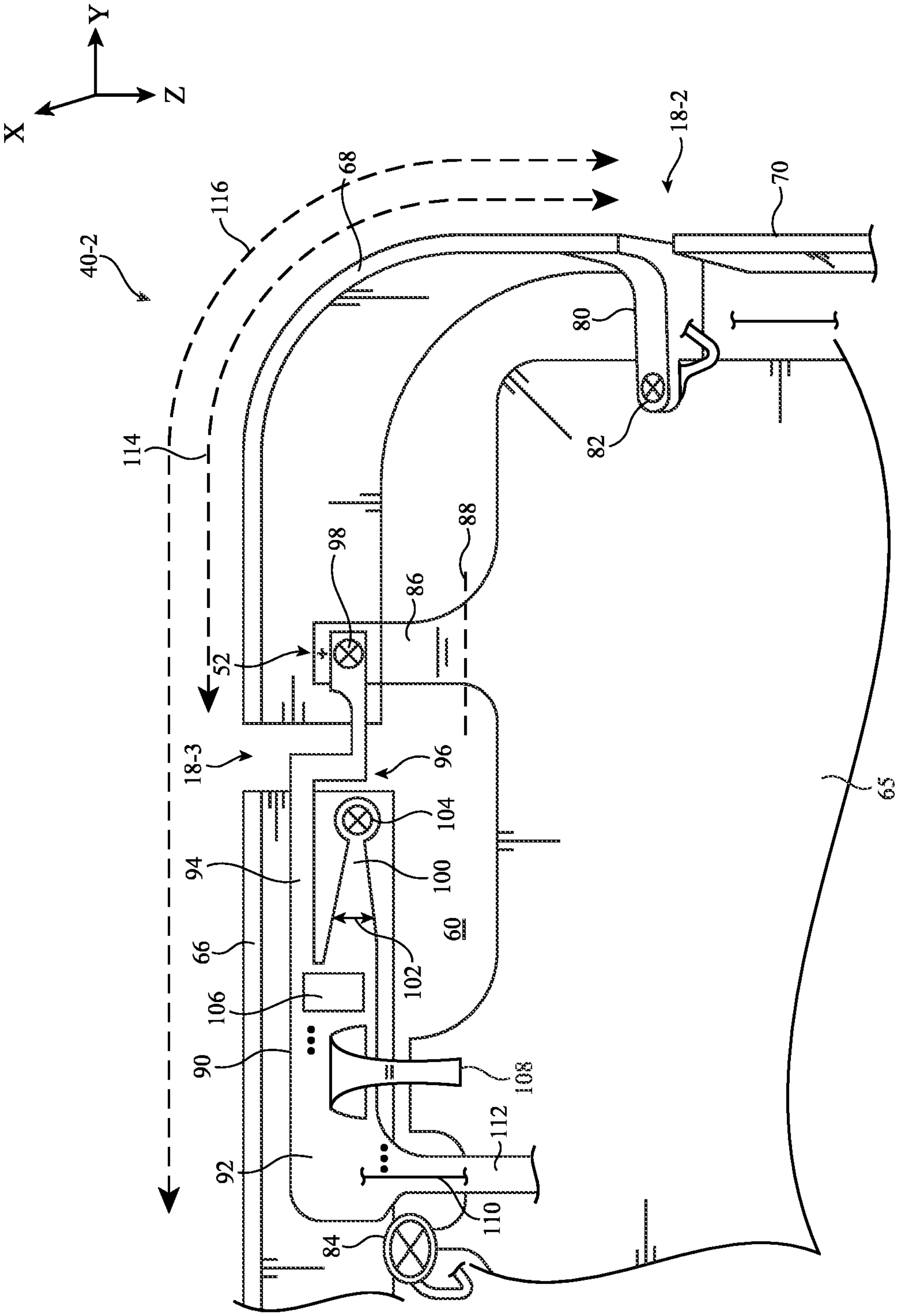
FIG. 6 is an interior rear view showing how an illustrative antenna overlapping a camera may be fed using a flexible printed circuit coupled to different segments of peripheral conductive housing structures across a split in the peripheral conductive housing structures in accordance with some embodiments.

FIG. 6 is a rear perspective interior view of the corner of device 10 including antenna 40-2, illustrating how antenna 40-2 may be configured to exhibit a wide bandwidth that covers frequencies from 1.1-5 GHz despite the presence of camera module 76 (FIG. 5) overlapping the volume of antenna 40-2. Due to the rotated rear perspective shown in FIG. 6, segment 66 of the peripheral conductive housing structures is illustrated as extending along the top of the page and segment 70 of the peripheral conductive housing structures is illustrated as extending along the right of the page of FIG. 6. However, segment 66 extends along the right side of device 10 and segment 70 extends along the top side of device 10 when viewed from the front of device 10 (e.g., as illustrated in FIG. 5).

As shown in FIG. 6, mid-chassis 65 in ground structures 78 (FIG. 5) may be separated from segments 66, 68, and 70 of the peripheral conductive housing structures by slot 60. Mid-chassis 65 may include a portion (tab) 86 that extends across slot 60, that is folded (bent) upwards about axis 88, and that is coupled to a point on the interior surface of a first end of segment 68 by conductive interconnect structure 98 (e.g., at or adjacent to gap 18-3). This point may form positive antenna feed terminal 52 of antenna 40-2. Segment 68 may have a second end opposite the first end (e.g., at or adjacent to gap 18-2). The second end of segment 68 may include an elongated portion or tab that extends across slot 60 and that is coupled to mid-chassis 65 by conductive interconnect structure 82. Mid-chassis 65 may also be coupled to a point on segment 66 by conductive interconnect structure 84. This point on segment 66 may be separated from gap 18-3 by a non-zero length. Conductive interconnect structure 84 may, if desired, also help to attach camera module 76 (FIG. 5) to mid-chassis 65.

Antenna 40-2 may be fed by a printed circuit such as flexible printed circuit 90 (sometimes referred to herein as antenna flex 90). Antenna flex 90 may include a main body portion 92, a first elongated portion such as first tail 100 extending from main body portion 92, a second elongated portion such as second tail 94 extending from main body portion 92 (e.g., in parallel with first tail 100), and a third elongated portion such as third tail 112 extending from main body portion 92 opposite tails 100 and 94. Main body portion 92, tail 100, and tail 94 may extend along (e.g., may be layered onto) the interior surface of segment 66 of the peripheral conductive housing structures. If desired, adhesive and/or other conductive interconnect structures may be used to help attach or secure antenna flex 90 to segment 66. Third tail 112 may be coupled to another printed circuit in device 10 (e.g., a main logic board for device 10) by a board-to-board (B2B) connector (not shown). Transceiver circuitry for the antenna (e.g., one or more transceivers 36 of FIG. 3) may be mounted to the other printed circuit and coupled to antenna flex 90 through the B2B connector or may, if desired, be mounted to antenna flex 90 itself.

Antenna flex 90 may include one or more stacked dielectric layers of flexible printed circuit substrate material (e.g., polyimide, liquid crystal polymer (LCP), or other flexible printed circuit materials). Antenna flex 90 may include conductive traces 110. Conductive traces 110 may be patterned onto one or more of the dielectric layers of antenna flex 90. Antenna flex 90 may include conductive vias extending through one or more of the dielectric layers to couple conductive traces 110 on different dielectric layers together.

A portion of the transmission line path 42 (FIG. 3) used to feed antenna 40-2 may be disposed on antenna flex 90. The conductive traces 110 on antenna flex 90 may include ground traces (e.g., conductive traces held at a ground potential, which may form part the ground conductor 48 of FIG. 3 for the transmission line path), signal traces (e.g., conductive traces that form part of signal conductor 52 of FIG. 3 for the transmission line path and that convey radio-frequency antenna current for the corresponding transceiver(s)), power lines (e.g., conductive traces that provide a power supply voltage to one or more components mounted to antenna flex 90), and/or control lines (e.g., conductive traces that provide control signals to one or more components mounted to antenna flex 90 to control or adjust the operation of the one or more components). Some or all of conductive traces 110 may extend through tail 112 to the B2B connector for antenna flex 90 if desired.

Tail 94 of antenna flex 90 may extend from segment 66, across gap 18-3, and along the interior surface of segment 68. The end of tail 94 may be coupled to the interior surface of segment 68 (e.g., at or adjacent to gap 18-3) by conductive interconnect structure 98. Conductive interconnect structure 98 may serve to mechanically attach, affix, or secure tail 94 and thus antenna flex 90 to the interior surface of segment 68.

Tail 100 of antenna flex 90 may extend along segment 66 in parallel to tail 94. The end of tail 100 may be coupled to a point on the interior surface of segment 66 (e.g., at or adjacent to gap 18-3) by conductive interconnect structure 104. Conductive interconnect structure 104 may serve to mechanically attach, affix, or secure tail 100 and thus antenna flex 90 to the interior surface of segment 66. Tail 94 of antenna flex 90 may include one or more (e.g., two) L-shaped bends 96 that help to allow tail 94 to extend beyond the end of tail 100 and across gap 18-3 to positive antenna feed terminal 52 (e.g., the L-shaped bend(s) may accommodate the presence of tail 100 underneath tail 94). Tail 94 may therefore sometimes be referred to herein as L-shaped tail 94 or L-tail 94. If desired, the L-shaped bend(s) may overlap gap 18-3.

The signal traces in conductive traces 110 may extend through main body portion 92 and through tail 94 of antenna flex 90. Conductive interconnect structure 98 may electrically couple the signal traces to positive antenna feed terminal 52 on segment 68. The ground traces in conductive traces 110 may extend through main body portion 92 and through tail 100 of antenna flex 90. The ground traces may be electrically coupled to ground structures 78 (FIG. 5) such as segment 66 and/or mid-chassis 65 at one or more locations. Conductive interconnect structure 104 may electrically couple the ground traces to a point on segment 66 (e.g., at or adjacent to gap 18-3).

As shown in FIG. 6, one or more tuning components 106 may be mounted to main body portion 92 of antenna flex 90. Tuning components 106 may be disposed on the ground traces and/or the signal traces in antenna flex 90. The control traces and the power traces in conductive traces 110 may extend through main body portion 92 to tuning components 106. The control signals may convey control signals that control or adjust the state of one or more of the tuning components (e.g., switches in the tuning component(s)).

A conductive spring such as conductive spring 108 may be disposed on the ground traces in main body portion 92 of antenna flex 90. Conductive spring 108 may couple the ground traces to the conductive frame of camera module 76 (FIG. 5) (e.g., conductive spring 108 may press against or exert a spring force against camera module 76). Conductive spring 108 may serve to short the ground traces on antenna flex 90 to the system ground (e.g., via the conductive frame for camera module 76) at a location that is as close to tuning components 106 as possible, thereby optimizing the wireless performance of tuning components 106 and antenna 40-2.

The ground traces on tail 100 of antenna flex 90 may couple one or more of tuning components 106 to segment 66 via conductive interconnect structure 104. Tail 100 may have a width 102 (e.g., measured orthogonal to a longitudinal axis of tail 100, which extends parallel to the Y-axis of FIG. 6). Tail 100 may have a tapered shape such that width 102 reduces from a maximum width at main body portion 92 to a lesser (e.g., minimum) width at conductive interconnect structure 104. The ground traces on tail 100 may also reduce in width as the ground traces extend through tail 100. This may serve to tune the impedance loading between tuning components 106 and ground (e.g., segment 66) in one or more frequency bands.

In some implementations, antenna 40-2 is fed by a signal conductor coupled to positive antenna feed terminal 52 on segment 68 that does not extend across gap 18-3 and that is not otherwise coupled to segment 66 via an antenna flex such as antenna flex 90. In these implementations, antenna 40-2 exhibits a radiating length 114 defined by segment 68 (e.g., the antenna resonating element of the antenna extends from gap 18-3 to gap 18-2 or return path 80). Radiating length 114 is relatively short, limiting the overall bandwidth covered by antenna 40-2 (e.g., preventing antenna 40-2 from covering relatively low frequencies such as frequencies in the L5 GPS band).

On the other hand, feeding antenna 40-2 across gap 18-3 using antenna flex 90 may serve to broaden the bandwidth covered by antenna 40-2. For example, radio-frequency antenna currents conveyed through tail 94 to positive antenna feed terminal 52 on segment 68 may also be coupled onto segment 66 through tuning components 106, tail 100, and conductive interconnect structure 104. This may serve to extend the radiating length of antenna 40-2 from gap 18-3 to also include the portion of segment 66 from gap 18-3 to conductive interconnect structure 84, as shown by radiating length 116 (e.g., the antenna resonating element of antenna 40-2 may include segment 68, the signal traces on tail 94, the conductive traces on tail 100, and the portion of segment 66 extending from gap 18-3 to conductive interconnect structure 84 such that the antenna resonating element extends along radiating length 116 from conductive interconnect structure 84 to gap 18-2 or return path 80). Increasing the radiating length of antenna 40-2 in this way may serve to broaden the overall bandwidth of antenna 40-2 (e.g., to include frequencies from 1.1 GHz to 5 GHz). Tuning components 106 may also be used to adjust the frequency response of antenna 40-2 to ensure that antenna 40-2 exhibits its satisfactory antenna efficiency across these frequencies.

In one implementation that is described herein as an example, conductive interconnect structures 84, 104, 98, and 82 each include at least one or more respective conductive bracket(s) and a respective conductive screw extending through opening(s) in the conductive bracket(s). If desired, conductive interconnect structure 84 may also include one or more conductive springs or pins that couple (short) mid-chassis 65 to display module 62 (FIG. 4) and optionally to conductive support plate 58 (FIG. 4) and/or conductive interconnect structure 82 may include one or more conductive springs or pins that couple (short) mid-chassis 65 to conductive support plate 58 (FIG. 4) and optionally to display module 62 (FIG. 4). This may, for example, serve to extend the antenna ground for antenna 40-2 to multiple conductive planes across the thickness of device 10 at locations close to the antenna resonating element, thereby optimizing the wireless performance of antenna 40-2. This example is merely illustrative and, in general, conductive interconnect structures 84, 104, 98, and 82 may each include any desired number of conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65, and/or any other desired conductive interconnect structures.

Figure 7:
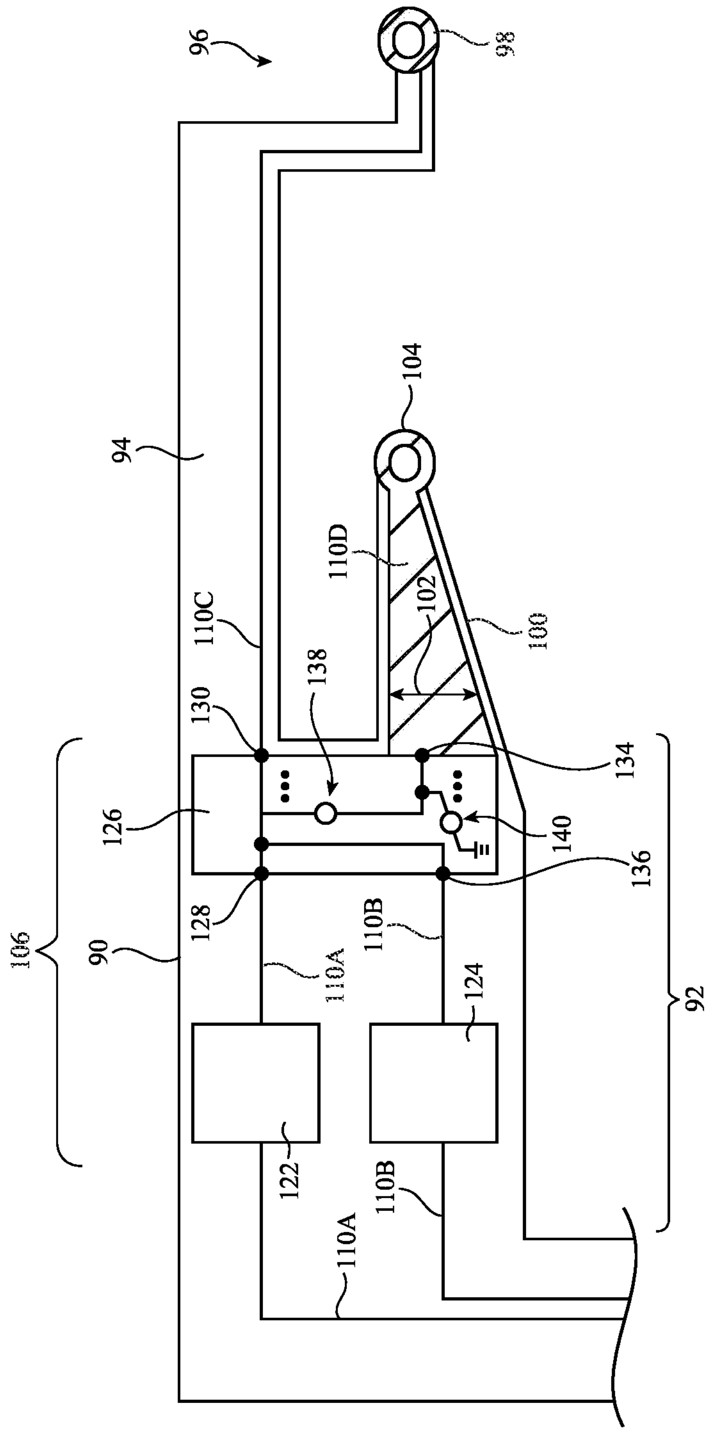
FIG. 7 is schematic diagram of illustrative components on a flexible printed circuit of the type shown in FIG. 6 in accordance with some embodiments.

FIG. 7 is a top view of antenna flex 90 showing how antenna flex 90 may feed antenna 40-2 of FIG. 6 while extending the antenna resonating element for antenna 40-2 to exhibit radiating length 116 of FIG. 6. As shown in FIG. 7, the conductive traces 110 on antenna flex 90 may include at least a first signal trace 110A and a second signal trace 110B. Signal trace 110A may convey radio-frequency signals (antenna currents) in a first set of one or more frequency bands such as the cellular LMB, MB, HB, and UHB, the S-band, the L-band, and the 2.4 GHz WLAN/WPAN bands (e.g., signal trace 110A may convey LMB signals, MB signals, HB signals, UHB signals, S-band signals, L-band signals, and/or 2.4 GHz WLAN/WPAN signals). Signal trace 110B may convey radio-frequency signals (antenna currents) in a second set of one or more frequency bands such as the L5 GPS band (e.g., signal trace 110B may convey L5 GPS signals).

Tuning components 106 may include a first filter 122 disposed on signal trace 110A and a second filter 124 on signal trace 110B. Tuning components 106 may also include tuner 126. Tuner 126 may have a first terminal (port) 128 coupled to signal trace 110A, a second terminal (port) 136 coupled to signal trace 110B, a third terminal (port) 130 coupled to signal trace 110C, and a fourth terminal (port) 134 coupled to ground trace 110D. Signal trace 110C may extend from tuner 126 through tail 94 to conductive interconnect structure 98. Conductive interconnect structure 98 may couple signal trace 110C to segment 68 at positive antenna feed terminal 52 (FIG. 6). Ground trace 110D may extend from tuner 126 to conductive interconnect structure 104. Conductive interconnect structure 104 may couple ground trace 110D to a point on segment 66 at or adjacent to gap 18-3 (FIG. 6).

Filter 122 may, for example, include a band reject (notch) filter, band pass filter, or other radio-frequency filter that passes radio-frequency signals in the first set of frequency bands (e.g., that forms a low or zero impedance in the cellular LMB, MB, HB, and UHB, the S-band, the L-band, and the 2.4 GHz WLAN/WPAN bands) while blocking or filtering out other frequencies (e.g., that forms a high or infinite impedance in other frequency bands). Filter 122 may include any desired number of resistors, capacitors, and inductors (e.g., fixed resistors, capacitors, and inductors) coupled in any desired manner between signal trace 110A and the ground traces on antenna flex 90 (not shown).

Filter 124 may, for example, include a low pass filter or other radio-frequency filter that passes radio-frequency signals in the second set of frequency bands (e.g., that forms a low or zero impedance in the L5 GPS band) while blocking or filtering out other frequencies (e.g., that forms a high or infinite impedance in other frequency bands). The low pass filter may, for example, have a cutoff frequency that is above a frequency in the L5 GPS band (e.g., the low pass filter may pass signals below the cutoff frequency while blocking signals above the cutoff frequency). Filter 124 may include any desired number of resistors, capacitors, and inductors (e.g., fixed resistors, capacitors, and inductors) coupled in any desired manner between signal trace 110B and the ground traces on antenna flex 90 (not shown). In this way, filters 122 and 124 may serve to separate the cellular LMB, MB, HB, and UHB, the S-band, the L-band, and the 2.4 GHz WLAN/WPAN band signals conveyed by signal trace 110A from the L5 GPS signals conveyed by signal trace 110B (e.g., despite signal traces 110A and 110B both being coupled to the same signal trace 110C and thus positive antenna feed terminal 52 of FIG. 6). Signal traces 110A and 110B may be coupled to separate transceivers 36 (FIG. 3) or to different respective ports of the same transceiver, for example.

Tuner 126 may include conductive traces that couple terminals 128 and 136 to terminal 130. Tuner 126 may therefore couple signal traces 110A and 110B to signal trace 110C. Tuner 126 may also include ground traces that couple (e.g., shunt) the signal traces to ground. For example, tuner 126 may include one or more tuning components 138 that couple the signal traces (e.g., terminals 128, 130, and 136) to terminal 134 and thus to ground trace 110D. Ground trace 110D may then couple the one or more tuning components to segment 66 (FIG. 6) over conductive interconnect structure 104. Tuning components 138 may include any desired number of tuning components coupled in series and/or in parallel between the signal traces and terminal 134. If desired, tuner 126 may include one or more additional tuning components 140 that couple terminal 134 and tuning component(s) 138 to ground or ground traces other than ground trace 110D. Tuning component(s) 140 may, for example, couple tuning component(s) 138 and terminal 134 to conductive spring 108 of FIG. 6.

Tuning components 138 and 140 may each include one or more fixed or adjustable resistors, capacitors, and/or inductors, one or more switches, and/or one or more ground terminals arranged in any desired manner. The switches may be used to adjust the resistance, capacitance, and/or inductance values of adjustable resistors, capacitors, and/or inductors, and/or may be used to selectively decouple or couple corresponding tuning components 138 or 140 into use or out of use between the signal traces and terminal 134 or ground. If desired, switches in tuning components 138 may be turned off or opened to decouple the signal conductors from terminal 134, thereby removing segment 66 (FIG. 6) from the antenna resonating element of the antenna. In general, tuning components 138 and 140 may serve to perform impedance matching for antenna 40-2 in the first and/or second sets of frequency bands, to tune the frequency response of antenna 40-2 in the first and/or second sets of frequency bands, and/or to couple antenna currents between the signal traces and segment 66 (FIG. 6) in one or more of the frequency bands in the first and second sets of frequency bands through ground trace 110D, effectively extending the resonating (radiating) length of antenna 40-2 to radiating length 116 of FIG. 6.

As shown in FIG. 7, ground trace 110D may have a width 102 that matches or extends parallel to the width of tail 100 of antenna flex 90. The width 102 of ground trace 110D may be tapered such that ground trace 110D extends from a first width 102 at tuner 126 to a second width 102 at conductive interconnect structure 104 that is less than the first width. Ground trace 110D may therefore sometimes also be referred to herein as tapered trace 110D or tapered ground trace 110D. Tapering the width of ground trace 110D in this way may serve to adjust the impedance loading to ground (e.g., segment 66 of FIG. 6) for antenna currents conveyed over signal traces 110A-110C. The impedance loading may be selected to form a smooth impedance transition in one or more of frequency bands in the first and second sets of frequency bands to effectively extend the radiating length of the antenna to radiating length 116 of FIG. 6, thereby maximizing the antenna efficiency of antenna across each of the frequency bands in the first and second sets of frequency bands and thus the bandwidth of antenna 40-2.

During signal transmission, antenna currents in the first set of frequency bands (e.g., LMB signals, MB signals, HB signals, UHB signals, S-band signals, L-band signals, and/or 2.4 GHz WLAN/WPAN signals) may be conveyed over signal trace 110A and through filter 122. Filter 122 may filter out other frequencies from the antenna currents. The antenna currents in the first set of frequency bands may pass from terminal 128 to terminal 130 and signal trace 110C. The antenna currents in the first set of frequency bands may pass to segment 68 over conductive interconnect structure 98 (at positive antenna feed terminal 52 of FIG. 6). If desired, some of the antenna currents in the first set of frequency bands may also pass through tuning component(s) 138 to terminal 134, through ground trace 110D (e.g., where the tapered width 102 of ground trace 110D forms a smooth impedance transition to ground for the antenna currents), and into segment 66 (FIG. 6) through conductive interconnect structure 104.

During signal reception, antenna currents in the first set of frequency bands may be conveyed from segment 68 (FIG. 6) onto signal trace 110C by conductive interconnect structure 98 (e.g., at positive antenna feed terminal 52 of FIG. 6), through signal trace 110C, from terminal 130 to terminal 128 of tuner 126, through filter 122, and through signal trace 110A to the corresponding transceiver. If desired, some of the antenna currents in the first set of frequency bands may also pass from segment 66 (FIG. 6) onto ground trace 110D via conductive interconnect structure 104, through ground trace 110D, through tuning component(s) 138, through filter 122, and through signal trace 110A to the corresponding transceiver. The additional radiating length provided by segment 66 may, for example, help to boost the efficiency of antenna 40-2 at relatively low frequencies such as frequencies in the cellular LMB or MB and/or in the S-band.

During signal reception, antenna 40-2 may also receive radio-frequency signals in the second set of frequency bands (e.g., the L5 GPS band). Antenna current in the second set of frequency bands may be conveyed from segment 68 (FIG. 6) onto signal trace 110C by conductive interconnect structure 98 (e.g., at positive antenna feed terminal 52 of FIG. 6), through signal trace 110C, from terminal 130 to terminal 128 of tuner 126, through filter 124, and through signal trace 110*b* to the corresponding transceiver. Antenna currents in the second set of frequency bands may also pass from segment 66 (FIG. 6) onto ground trace 110D via conductive interconnect structure 104, through ground trace 110D, through tuning component(s) 138, through filter 124, and through signal trace 110B to the corresponding transceiver. Filters 122 and 124 may help to separate (e.g., frequency multiplex) the signals in the first set of frequency bands from the signals in the second set of frequency bands for passing the signals onto signal traces 110A or 110B. The additional radiating length provided by segment 66 may allow antenna 40-2 to convey radio-frequency signals at relatively low frequencies such as frequencies in the L5 GPS band, despite the short length of segment 68 of FIG. 6.

The examples of FIGS. 6 and 7 are merely illustrative. If desired, segments 66, 68, and 70 and/or mid-chassis 65 may have other shapes having any desired number of curved and/or straight segments or edges. The tuning components of tuner 126 may be arranged in any desired manner. Ground trace 110D may have other shapes having any desired number of curved and/or straight segments or edges. Antenna flex 90 may have other shapes having any desired number of curved and/or straight segments or edges. The feeding scheme shown in FIGS. 6 and 7 may be used to feed any of the antennas in device 10.

Figure 8:
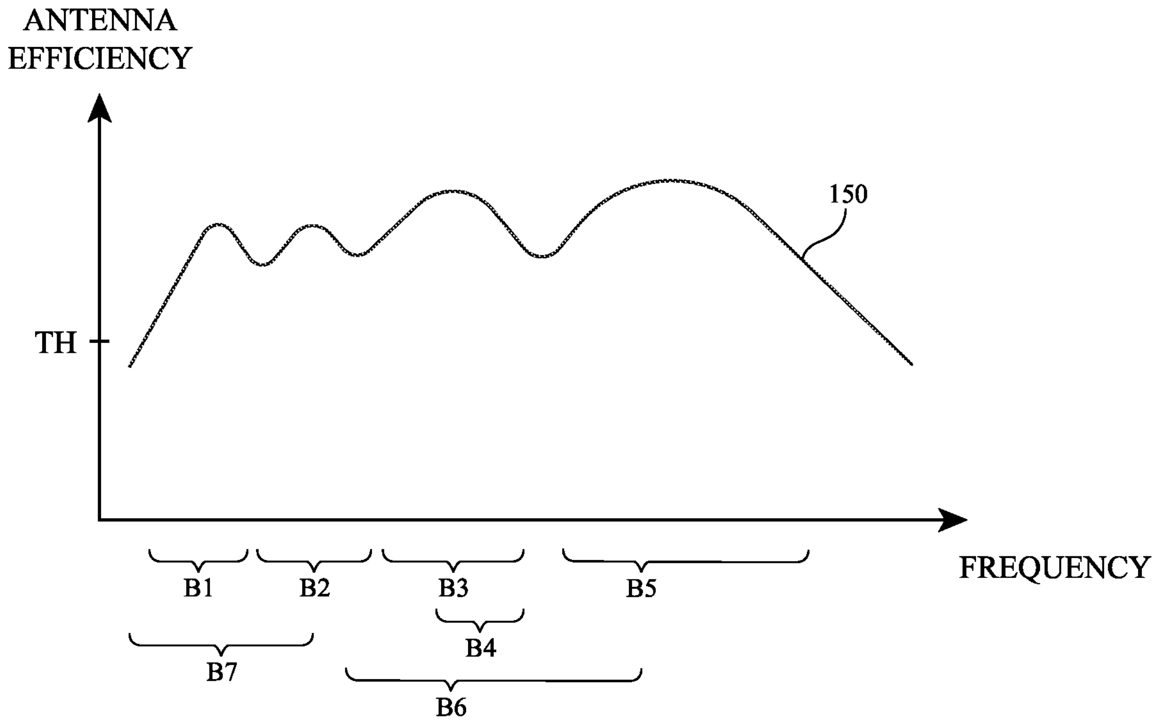
FIG. 8 is a plot of antenna performance (antenna efficiency) as a function of frequency for an illustrative antenna of the type shown in FIG. 6 in accordance with some embodiments.

FIG. 8 is a plot of antenna efficiency as a function of frequency for antenna 40-2. As shown by curve 150 of FIG. 8, feeding antenna 40-2 at segments 66 and 68 and across gap 18-3 using antenna flex 90 may produce several response peaks such as response peaks in frequency bands B1, B2, B3, B4, B5, B6, and/or B7.

As an example, frequency band B1 may be the L5 GPS band. The response peak in frequency band B1 may allow antenna 40-2 to convey L5 GPS signals (e.g., over signal trace 110B of FIG. 7) with satisfactory antenna efficiency. Frequency band B2 may be the cellular LMB and MB (e.g., around 1400-2200 MHz). Frequency band B3 may be the cellular HB (e.g., around 2300-2700 MHz). Frequency band B4 may be the 2.4 WLAN/WPAN band. Frequency band B5 may be the cellular UHB (e.g., around 3300-5000 MHz). Frequency band B6 may be the S-band (e.g., around 2-4 GHz). Frequency band B7 may be the L-band (e.g., around 1-2 GHz).

In this way, antenna 40-2 may be configured to cover a relatively wide bandwidth from around 1.1 GHz to around 5 GHz (e.g., antenna 40-2 may exhibit an antenna efficiency that exceeds a threshold efficiency TH from around 1.1 GHz to around 5 GHz or within each of bands B1-B7), thereby allowing the antenna to convey L5 GPS signals, LMB signals, MB signals, HB signals, UHB signals, WLAN/WPAN signals, S-band signals, and/or L-band signals with satisfactory levels of wireless performance despite the small size of antenna 40-2 and the presence of the overlapping camera module 76 (FIG. 5). The example of FIG. 8 is merely illustrative. Curve 150 may have other shapes in practice. Bands B1-B7 may include any desired frequencies.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures having a dielectric-filled gap that divides the peripheral conductive housing structures into a first segment and a second segment;

a ground layer separated from the first and second segments by a slot;

a flexible printed circuit that extends along the first segment, the flexible printed circuit having a first tail coupled to the first segment and having a second tail that extends across the dielectric-filled gap and that is coupled to the second segment;

a first conductive trace on the first tail and coupled to the first segment; and a second conductive trace on the second tail, the second conductive trace being coupled to the first conductive trace and the second segment, and the first and second conductive traces being configured to convey a radio-frequency antenna current.

2. The electronic device of claim 1, wherein the flexible printed circuit has a main body portion that extends along the first segment, the first and second tails extending in parallel from the main body portion.

3. The electronic device of claim 2, wherein the second tail has an L-shaped bend.

4. The electronic device of claim 3, wherein the L-shaped bend overlaps the dielectric-filled gap.

5. The electronic device of claim 1, further comprising:

a first conductive interconnect structure that couples the first tail and the first conductive trace to the first segment; and a second conductive interconnect structure that couples the second tail and the second conductive trace to a positive antenna feed terminal on the second segment.

6. The electronic device of claim 5, further comprising:
a third conductive interconnect structure that couples the ground layer to the first segment; and
a fourth conductive interconnect structure that couples the ground layer to the second segment.

7. The electronic device of claim 6, further comprising:
an additional dielectric-filled gap in the peripheral conductive housing structures that separates the second segment from a third segment of the peripheral conductive housing structures, wherein the second conductive interconnect structure couples the second tail and the second conductive trace to the second segment at the dielectric-filled gap, the fourth conductive interconnect structure being coupled to the second segment at the additional dielectric-filled gap.

8. The electronic device of claim 6, wherein the second segment is configured to convey the radio-frequency antenna current between the dielectric-filled gap and the fourth conductive interconnect structure, the first conductive trace is configured to convey the radio-frequency antenna current onto the first segment, and the first segment is configured to convey the radio-frequency antenna current between the first and third conductive interconnect structures.

9. The electronic device of claim 6, further comprising:
a display mounted to the peripheral conductive housing structures; and
a housing wall mounted to the peripheral conductive housing structures opposite the display, the housing wall having a dielectric cover layer and a conductive layer on the dielectric cover layer, wherein the third conductive interconnect structure comprises a first conductive spring configured to couple the ground layer to the display and the fourth conductive interconnect structure comprises a second conductive spring configured to couple the ground layer to the conductive layer.

10. The electronic device of claim 5, further comprising:
a tuner mounted to the flexible printed circuit, wherein the tuner has a first terminal coupled to the first conductive trace and a second terminal coupled to the second conductive trace.

11. The electronic device of claim 10, wherein the first conductive trace has a width that decreases from the tuner to the first conductive interconnect structure.

12. The electronic device of claim 10, wherein the tuner has a third terminal and a fourth terminal, further comprising:
a third conductive trace on the flexible printed circuit and coupled to the third terminal;
a first filter disposed on the third conductive trace, the first filter being configured to pass a first frequency band of the radio-frequency antenna current while blocking a second frequency band of the radio-frequency antenna current;
a fourth conductive trace on the flexible printed circuit and coupled to the fourth terminal; and
a second filter disposed on the fourth conductive trace, the second filter being configured to pass the second frequency band of the radio-frequency antenna current while blocking the first frequency band of the radio-frequency antenna current.

13. The electronic device of claim 1, further comprising:
a ground trace on the flexible printed circuit;
a camera at least partially overlapping the slot; and
a conductive spring on the flexible printed circuit that couples the ground trace to the camera.

14. An electronic device comprising:
a first conductive structure;
a second conductive structure separated from the first conductive structure by a dielectric-filled gap;
a radio-frequency transmission line path having a signal conductor that extends across the dielectric-filled gap and that is coupled to an antenna feed terminal on the second conductive structure; and
a tapered conductive trace that couples the signal conductor to the first conductive structure.

15. The electronic device of claim 14, wherein the tapered conductive trace has a first end coupled to the signal conductor and an opposing second end coupled to the first conductive structure, the tapered conductive trace having a first width at the first end and a second width at the second end that is less than the first width.

16. The electronic device of claim 15, further comprising:
a tuning component coupled between the signal conductor and the first end of the tapered conductive trace.

17. The electronic device of claim 14, further comprising:
peripheral conductive housing structures, wherein the first conductive structure comprises a first segment of the peripheral conductive housing structures and the second conductive structure comprises a second segment of the peripheral conductive housing structures; and
a flexible printed circuit having a first tail that extends along the first segment and a second tail that extends along the first segment, across the dielectric-filled gap, and along the second segment, the signal conductor comprising a conductive trace on the second tail and the tapered conductive trace being disposed on the first tail.

18. An electronic device comprising:
peripheral conductive housing structures having a first dielectric-filled gap that separates a first segment of the peripheral conductive housing structures from a second segment of the peripheral conductive housing structures and having a second dielectric-filled gap that separates the second segment from a third segment of the peripheral conductive housing structures;
a conductive layer separated from the first, second, and third segments by a slot, the conductive layer being coupled to a first location on the first segment and to a second location on the second segment across the slot;
a flexible printed circuit that extends along the first segment and the second segment, the flexible printed circuit having conductive traces that are coupled between a third location on the second segment and a fourth location on the first segment; and
an antenna, wherein a portion of the first segment from the first location to the fourth location, the conductive traces, and the second segment form at least part of an antenna resonating element for the antenna.

19. The electronic device of claim 18, further comprising:
radio-frequency transceiver circuitry, the conductive traces on the flexible printed circuit being coupled to the radio-frequency transceiver circuitry.

20. The electronic device of claim 19, further comprising:
a tuner mounted to the flexible printed circuit and having first, second, third, and fourth terminals, wherein the conductive traces comprise a first conductive trace that couples the first terminal to the third location on the second segment across the first-dielectric filled gap, a second conductive trace that couples the second terminal to the radio-frequency transceiver circuitry, a third conductive trace that couples the third terminal to the radio-frequency transceiver circuitry, and a tapered trace that couples the fourth terminal to the fourth location on the first segment.

* * * * *